US005900874A

United States Patent [19]
Shrader et al.

[11] Patent Number: 5,900,874
[45] Date of Patent: May 4, 1999

[54] ICON TRANSFORMATION SYSTEM

[75] Inventors: Theodore Jack London Shrader; Keith James Scully, both of Austin, Tex.

[73] Assignee: International Business Machines Corporation, Armonk, N.Y.

[21] Appl. No.: 07/880,822

[22] Filed: May 11, 1992

[51] Int. Cl.$^6$ ............................................. G06F 15/00
[52] U.S. Cl. ............................................. 345/348
[58] Field of Search ........................... 395/155, 159, 395/161, 133, 138; 345/333, 339, 348, 349, 350

[56] References Cited

U.S. PATENT DOCUMENTS

| | | | |
|---|---|---|---|
| 4,811,240 | 3/1989 | Ballou et al. | 364/518 |
| 4,813,013 | 3/1989 | Dunn | 364/900 |
| 4,899,136 | 2/1990 | Beard et al. | 340/706 |
| 4,939,507 | 7/1990 | Beard et al. | 340/706 |
| 4,974,173 | 11/1990 | Stefik et al. | 364/521 |
| 5,008,853 | 4/1991 | Bly et al. | 364/900 |
| 5,021,976 | 6/1991 | Wexelblat et al. | 364/521 |
| 5,049,931 | 9/1991 | Knodt | 355/209 |
| 5,060,135 | 10/1991 | Levine et al. | 364/200 |
| 5,065,347 | 11/1991 | Pajak et al. | 395/159 |
| 5,072,412 | 12/1991 | Henderson, Jr. et al. | 395/159 |
| 5,079,723 | 1/1992 | Herceg et al. | 395/156 |
| 5,101,425 | 3/1992 | Darland et al. | 379/34 |
| 5,113,517 | 5/1992 | Beard et al. | 364/200 |
| 5,122,717 | 6/1992 | Hayashi | 318/569 |
| 5,122,959 | 6/1992 | Nathanson et al. | 364/436 |
| 5,230,063 | 7/1993 | Hoeber et al. | 395/156 |

OTHER PUBLICATIONS

IBM Technical Disclosure Bulletin, List Style to Display Mini Icons Horizontally, vol. 32, No. 12, May, 1990, p. 52.

*Primary Examiner*—Phu K. Nguyen
*Attorney, Agent, or Firm*—Jenkens & Gilchrist; Mark S. Walker

[57] ABSTRACT

A method, system and program for transforming one or more icons in an object-oriented, graphical environment. The icon transformations entail the changing of an icon from one state to another using drag and drop techniques. The user drops an input object icon onto the transformer object icon. The transformer object removes the input object from the graphical environment, changes its contents and/or attributes, and places the new output icon on the desktop. Icon transformers convert objects in a one-to-one, many-to-one, one-to-many, or many-to-many fashion.

19 Claims, 5 Drawing Sheets before after before after

ICON TRANSFORMATION SYSTEM

FIELD OF THE INVENTION

This invention generally relates to improvements in computer display systems and more particularly to directly manipulating a graphic display system using icon based actions.

BACKGROUND OF THE INVENTION

Using icons to organize a display and giving a user the appearance of an electronic desktop first appeared at Xerox Parc in the late 70's. Early attempts to commercialize a desktop motif were unsuccessful. However, an implementation is disclosed in U.S. Pat. No. 5,060,135, "Apparatus for Manipulating Documents in a Data Processing System Utilizing Reduced Images of Sheets of Information Which Are Movable." More recently, the IBM OS/2 Workplace Shell desktop motif provides icon manipulation. For example, users can drag a document icon, representing a letter, and drop it on the shredder icon to delete the document.

Other examples of icon manipulation include, U.S. Pat. No. 5,021,976 entitled, "Method and System for Generating Dynamic Interactive Visual Representations of Information Structures Within a Computer," which discloses a knowledge based system that links various mathematical relationships with icons on a graphical display. Visual features of the display assume various conditions (change of color/size) in accordance with the mathematical relationships.

However, none of the prior art techniques provide a method for easily and flexibly manipulating the information in an icon from one form to another in accordance with the subject invention.

SUMMARY OF THE INVENTION

Accordingly, it is a primary object of the present invention to provide a method in which icon transformers can be used in an object-oriented, graphical environment to change the contents of an icon from one state to another using drag and drop techniques.

These and other objects are accomplished by creating a transformer object, represented by an icon, that has an associated set of rules stored in an associated data structure. This transformer object modifies the attributes of a dropped icon and changes its contents to a new object, while retaining some of the attributes from the original object, if needed. If a user drops an icon object on a transformer icon and the dropped object does not conform to the input expected by the transformer, the input icon is transformed into a not symbol.

For valid input object processing, when the user drops an object on a transformer object, it is removed from the desktop, application window, or container object from which it came. In its place, an output object icon is created next to the icon transformer object. This output object icon's contents are a modified version of the dropped input object's contents. The contents are changed in accordance with the rules in the transformer object.

Users can also duplicate their input objects and drop them separately or in a group on top of an icon transformer. The transformer changes one or more of the input objects into their output object counterparts based on the number of objects dropped on the transformer.

Objects can be changed from one state to another in current application implementations. For example, when importing a text file from word processor X to word processor Y, the latter word processor converts a document from X into one that Y can understand. This technique involves changing the contents of the file and/or its attributes. However, this processing does not address the problem in an object-oriented manner. These actions take place within the application and not outside of it, such as on the desktop or in a window container. Icon transformers can exist where icons can be dragged and dropped to convert objects in a one-to-one, many-to-one, one-to-many, or many-to-many fashion.

DETAILED DESCRIPTION OF THE INVENTION

Figure 1:
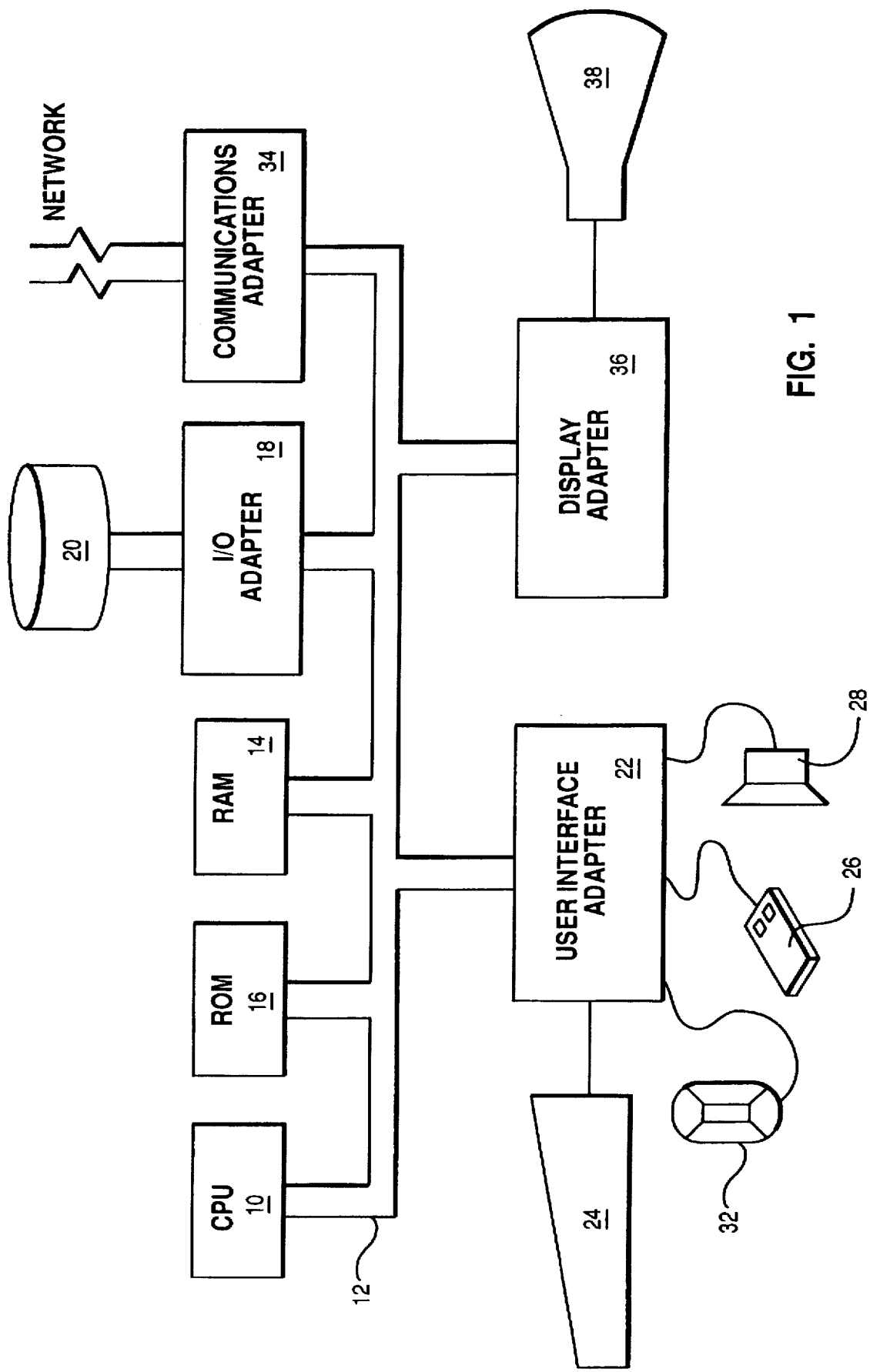
FIG. 1 is a block diagram of a personal computer system in accordance with the subject invention.

The invention is preferably practiced in a representative hardware environment as depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting Peripheral devices such as disk units 20 and tape drives 40 to the bus, a user interface adapter 22 for connecting a keyboard 24, a mouse 26, a speaker 28, a microphone 32, and/oi, other user interface devices such as a touch screen device (not shown) to the bus, a communication adapter 34 for connecting the workstation to a data processing network and a display adapter 36 for connecting the bus to a display device 38.

The invention is a method and system for easily changing information associated with an icon from one state to another. For example, a user may require that a document be changed from one word processing format to another (Revisable Form Text (RFT) to WordPerfect). Today, this would be accomplished by invoking a CONVERT program from the command line or from an internal application call and inputing the source and destination file for the conversion. Then, the program would process the source information and convert the file into the destination output file.

Figure 2:
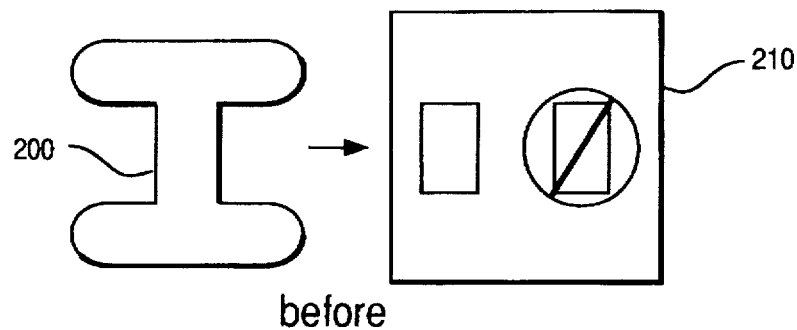
FIG. 2 illustrates a file input icon and a converted output icon before and after a conversion operation in accordance with the subject invention.

The subject invention allows a user to convert a file by simply dragging the file icon to an icon representative of a convert operation and dropping the file icon onto the convert icon. This action will invoke a convert operation that transforms the original file associated with the file icon into a converted file associated with a new icon representative of the converted file. FIG. 2 shows the file icon 200 and the convert icon 210 before the conversion operation, and the convert icon 220 and the converted file icon 230 after the convert operation. Note that the shape of the icon has changed.

Figure 3:
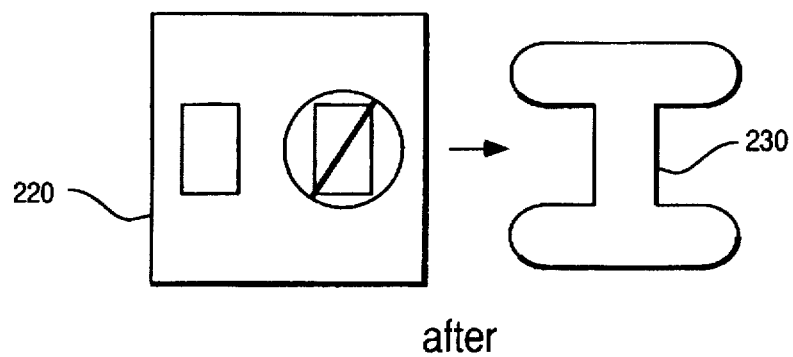
FIG. 3 is a data structure representing an icon in accordance with the subject invention.
Figure 3:
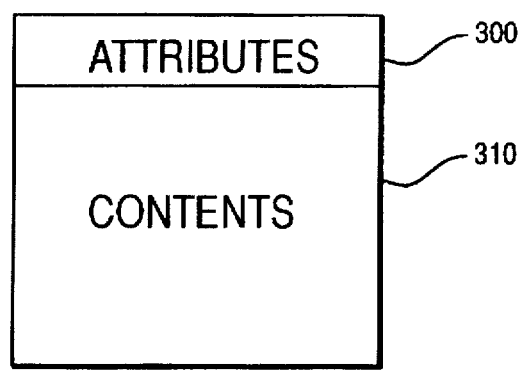

FIG. 3 is a data structure representing the icon. Attribute information 300 contains descriptive information pertaining to the icon similar to a header in a data file. The contents 310 are similar to text in a data file.

Figure 4:
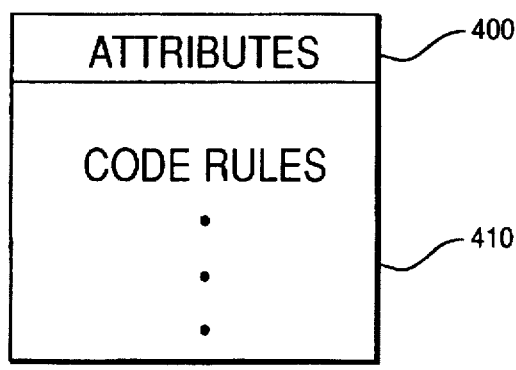
FIG. 4 is a data structure representing a transformation icon in accordance with the subject invention.

FIG. 4 is a data structure representing a transformation icon. Attribute information 400 contains descriptive information pertaining to the icon similar to a header in a data file. The contents 410 contain rules associated with a transformation operation that is invoked when an icon is dropped on the transformation icon.

Figure 5:
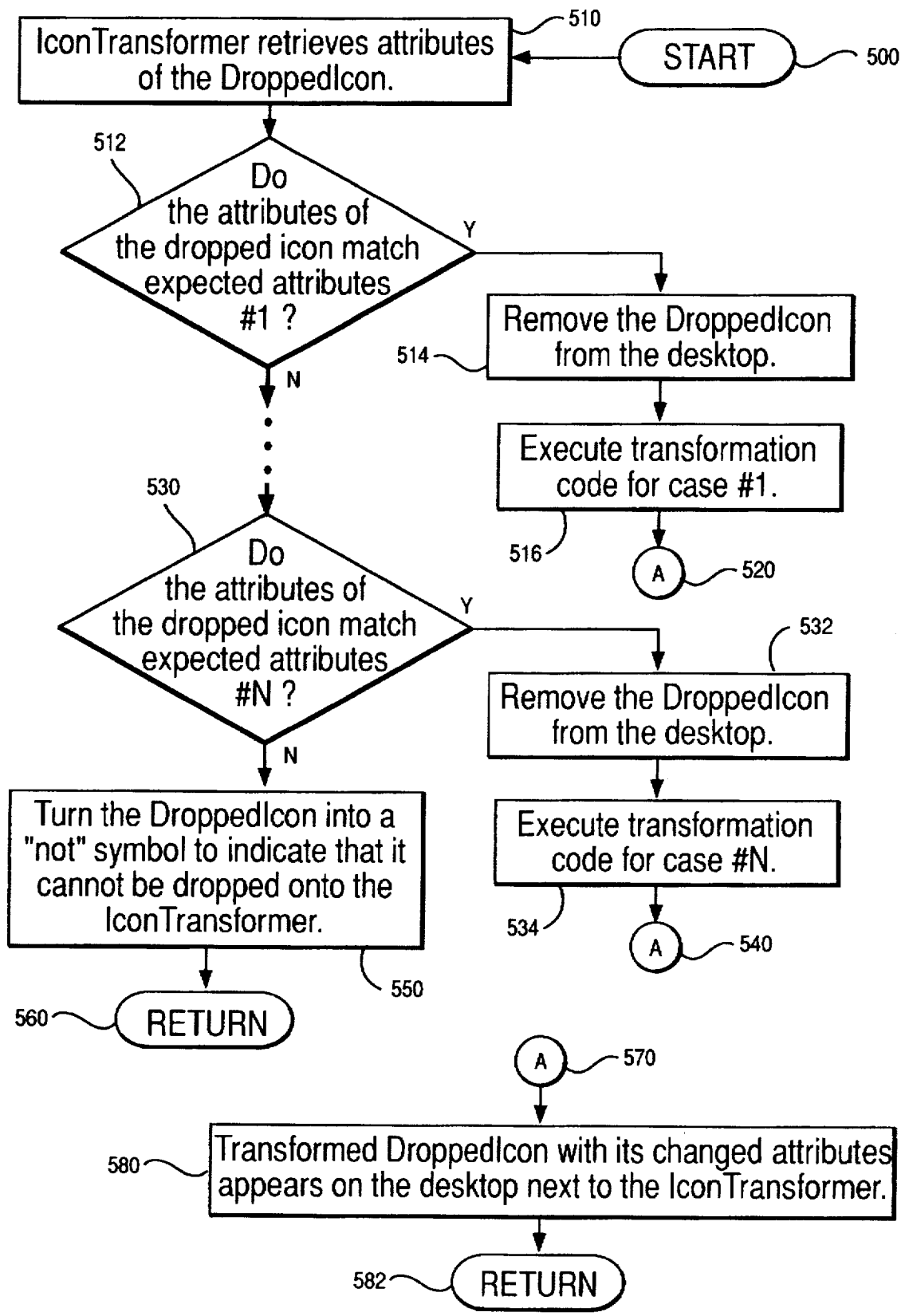
FIG. 5 is a flowchart of the icon transformation logic in accordance with the subject invention.

FIG. 5 is a flowchart depicting detailed logic in accordance with the subject invention. Processing commences at terminal block 500 and immediately passes to function block 510 where the icon transformer retrieves attributes of an icon dropped on it. Then a test is performed at decision block 512 to determine if the dropped icon has compatible attributes. If compatibility is detected, then the dropped icon is removed from the desktop at function block 514, the transformation code is executed at function block 516 and control passes via label 520 to label 570 where the transformed icon is redisplayed next to the icon transformer as shown in function block 580. The desktop metaphor in this example can be an application window or a container object similar to that found in the OS/2 operating system.

If the attributes do not match at decision block 512, then further tests are performed in a similar fashion leading up to decision block 530 to determine if the attributes of the dropped icon match another characteristic that the icon transformer can handle. If so, then the dropped icon is removed from the display at function block 532, transformation code associated with the characteristic is executed at function block 534 and the transformed icon is redisplayed next to the icon transformer at function block 580. If no match is detected between the dropped icon's attributes and any of the transformer characteristics, then the dropped icon is redisplayed in an error mode (such as turning it into a not symbol) as shown in function block 550.

Figure 6A:
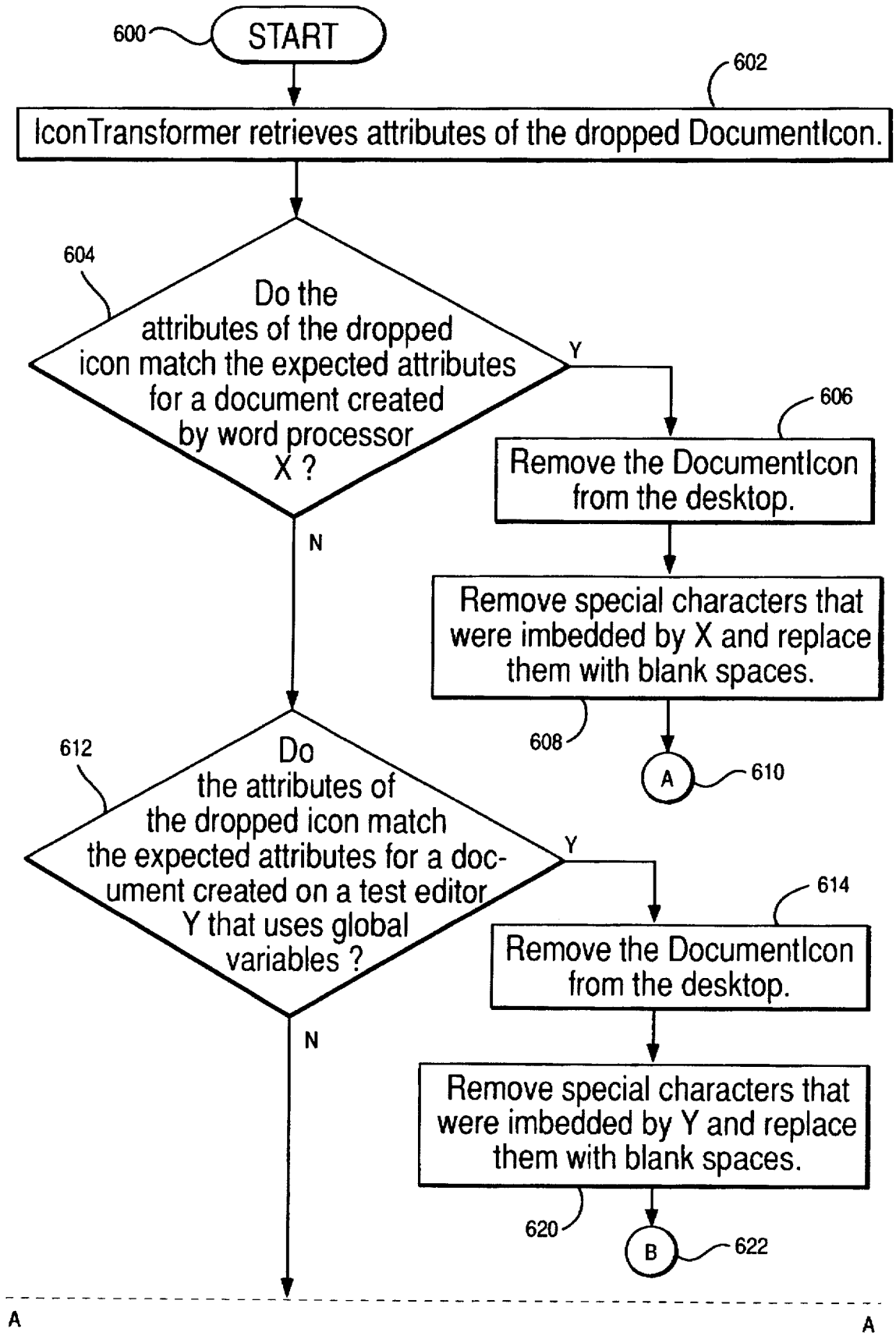
FIG. 6 is a flowchart of the icon transformation logic in accordance with the subject invention.
Figure 6B:
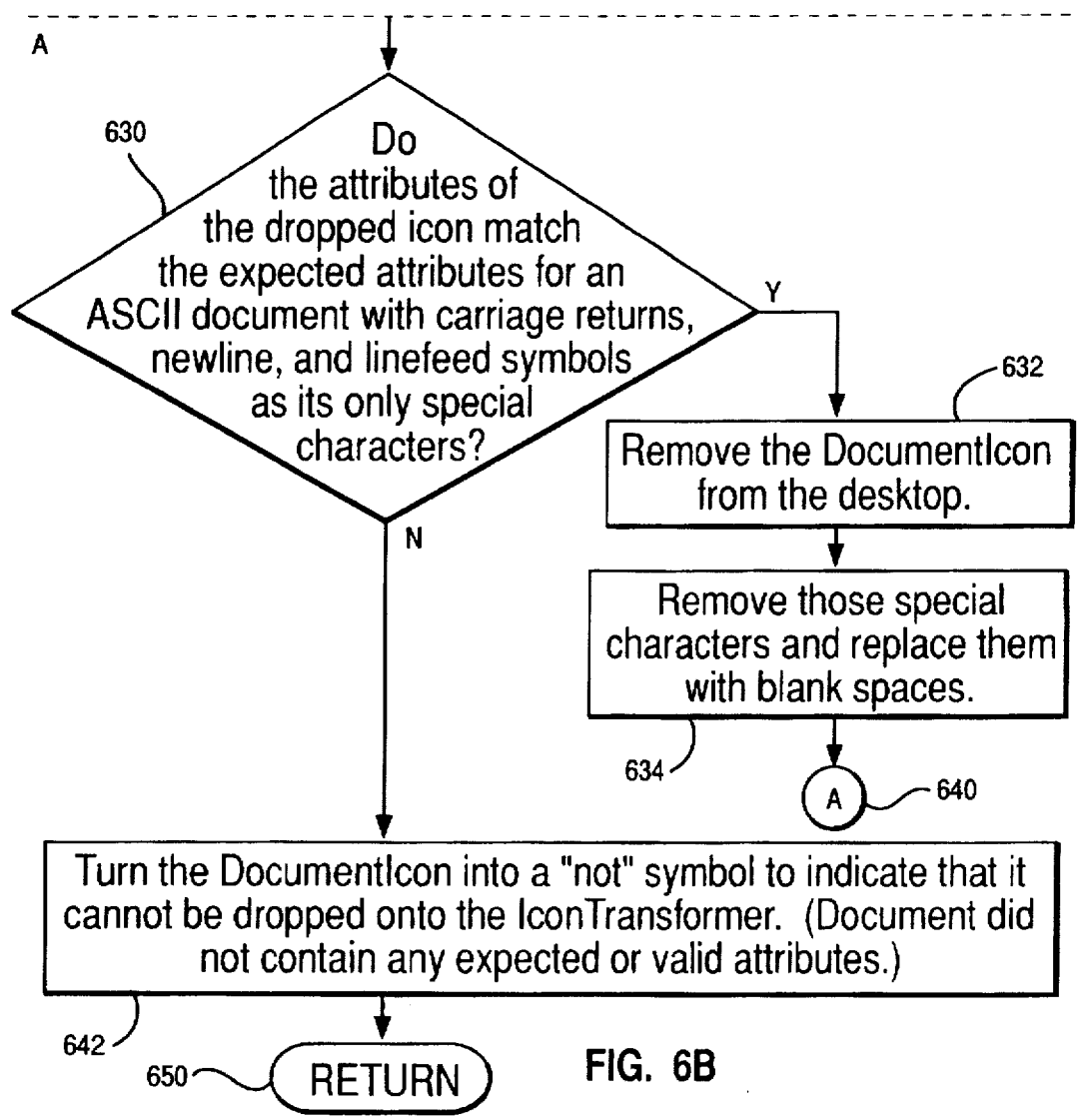
Figure 7:
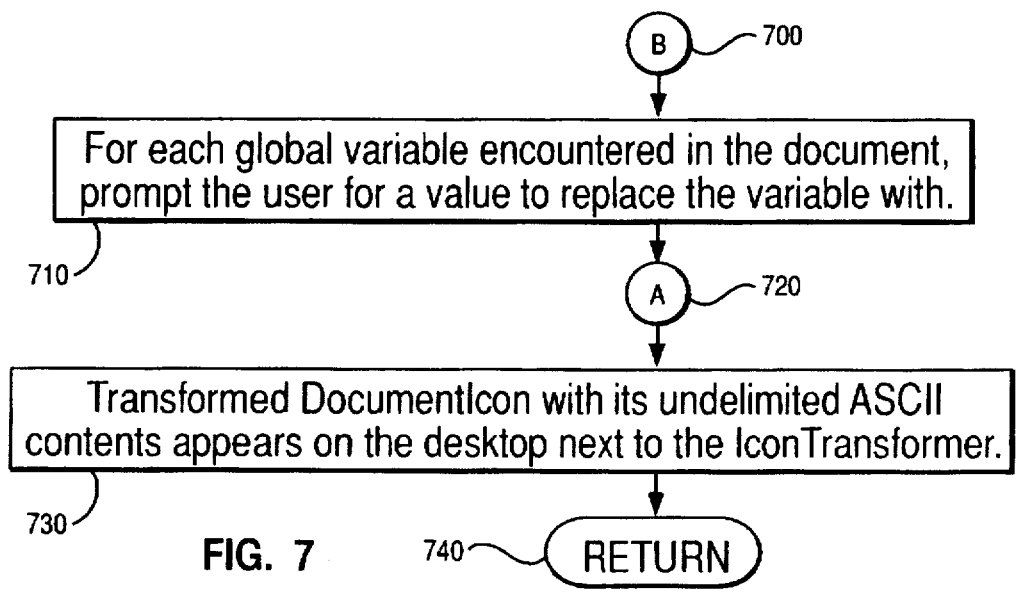
FIG. 7 is a flowchart of the transformation logic in accordance with the subject invention.

FIG. 6 is a flowchart of the detailed logic in accordance with the subject invention. Processing commences at terminal 600 and control immediately passes to function block 602 where attributes of the icon dropped on the icon transformer are retrieved. Then, at decision block 604 a test is performed to determine if the attributes of the dropped icon match the expected attributes for a document created by a word Processor X. If a match is detected, then the document icon is removed from the desktop as shown in function block 606, the special characters that were imbedded by X are replaced with spaces as set forth in function block 608 and control is passed via label 610 to FIG. 7 at label 720. In FIG. 7 at label 730, the transformed document icon is redisplayed and the information associated with the transformed icon is now an undelimited ASCII file.

If the attributes of the dropped icon do not match at decision block 604, then another test is performed at decision block 612 to determine if the attributes of the dropped icon match the expected attributes for a document created on a text processor Y that uses global variables. If so, then the document icon is removed from the desktop at 614, the special characters imbedded by Y are replaced with blank spaces at function block 620 and control is passed via label 622 to label 700 of FIG. 7. In FIG. 7, processing resumes at function block 710 where each global variable is replaced by the value assigned by a user and the transformed icon is redisplayed with its modified underlying contents at function block 730.

If no match is detected at decision block 612, then in decision block 630 a test is performed to determine if the attribute of the dropped icon match with a delimited ASCII file. If so, then the document icon is removed at function block 632, the special characters are removed at function block 634, control is passed via label 640 to label 720 and processing is completed at function block 730 as described above. If no match is detected, then the icon is modified to present an error to the user at function block 642 and control is returned at terminal 650.

CODE IN ACCORDANCE WITH THE INVENTION

The following code was written in Smalltalk/V PM for the OS/2 environment. TransExample (the Transformation Example) is the main class where the open method can be run. Its supporting classes are DragTest class where rendering and target and source transferring methods are stored and the TransItem class which is the parent class for the drag/drop objects involved in the prototype.

The TransIFile subclass represents the input file to the transformer (or the object that will be dragged and dropped on the transformer object). The TransoFile subclass represents the output file from the transformer (or the object that is created from an object that was dragged and dropped on the transformer object). The Transformer subclass represents the object icon that transforms the input object to the

AT9-92-008 output object. It also contains the rules to
change the contents of dropped objects.

The drag objects were created to represent
the input file object (the one to be
transformed), the transformer object (the one
that performs an action on the contents of the
dropped object), and the output file object (the
object after it has been transformed). Note that
the output file object retains many of the
attributes of the input file object, except most
notably, the contents of the object changes as
well as the shape, size, and or hues of the icon.
This visually signifies that the object underwent
a transformation. Note that transformations need
not take place only on document or text objects.
They can also occur on other objects as well, so
long as there is a defined process of
transformation from the input to the
output object.

TRANSFORMATION CLASS SOURCE CODE

```
ViewManager subclass: #TransExample
instanceVariableNames:
    'container '
  classVariableNames: ''
  poolDictionaries:
    'PMConstants PMContainerConstants ' !

!TransExample class methods ! !

!TransExample methods !
  defineFieldsIn: aContainer
            "Define the detail view fields
    for the container."
        | fields |
        fields := OrderedCollection new.
```

```
                                      10 fields
                      add: (ContainerDetailField new
                                         name: #pszIcon);
                      add: (ContainerDetailField new
 5                                       name: #hptrIcon;
                                         containsGraphic
             ).
             aContainer fields: fields asArray!

10       delete: aContainer
                      "Delete the selected item in
         aContainer."
                 | items name |
                 items := aContainer selectedItems.
15               items do: [:item |
                         item class == TransIFile ifTrue:
         [
                                  name := item
         containerName, item name.
20                                        ( MessageBox
         confirm: 'Delete ', name, '?' ) ifTrue: [ aContainer deleteItem: item ]]].!

25       drop: item into: aContainer at: anOffset
                      "Drop an item into aContainer as
         appropriate
                      for text or icon display mode at
         anOffset point."
30               | matching newItem |
                 matching := (aContainer itemsMatching:
         item name)
                         select: [:each| each name
         asUpperCase = item name asUpperCase].
35               ( ( aContainer dragData at: 4 ) =
         CnDragover )
                         ifTrue: [matching do: [:each|
         aContainer deleteItem: each].
                         ((aContainer dragData at: 2 )
40       notNil and:
```

AT9-92-008

11

[(( aContainer dragData
        at: 2 ) name) = 'TransFile'])
                                    ifTrue:[newItem :=
        TransItem className: 'OutFile' transformedName:
5       item name.
                                    newItem
                                    allocateFieldsIn:
        aContainer;
                                    position: ( ( (
10      aContainer dragData at: 3 )
                                    dropCoord
        mapScreenToClient: aContainer )
                                                    +
        anOffset + aContainer workSpaceOrigin ).
15                                  aContainer
        insertItem: newItem.
                                    ]
                                    ifFalse: [newItem :=
        TransItem className: item name ftype: item ftype.
20                                  newItem
                                    allocateFieldsIn:
        aContainer;
                                    position: ( ( (
        aContainer dragData at: 3 )
25                                  dropCoord
        mapScreenToClient: aContainer )
                                                    +
        anOffset + aContainer workSpaceOrigin ).
                                    aContainer
30      insertItem: newItem.
                                    ]
                                    ]
                                    ifFalse: [matching do:
        [:each| aContainer deleteItem: each].
35                                  newItem :=
        TransItem className: item name ftype: item ftype.
                                    newItem allocateFieldsIn: aContainer;
40                                  position:
        anOffset + ( aContainer extent // 2 ).

AT9-92-008

12

```
                                    aContainer insertItem: newItem after:
                                            ( (
 5      aContainer dragData at: 2 ) isNil ifTrue: [ CmaFirst ]

ifFalse: [ aContainer dragData at: 2 ] ).
10                              ]!

droppingItems: aContainer
                    "Items are scheduled to be
        dropped into aContainer."
15          | target |
            target := aContainer dragData at: 2.
            ( target notNil and: [ ( aContainer
        dragData at: 4 ) = CnDragover ] )
                    ifTrue: [aContainer dragDrop
20      target: ( target name ) ].!

insertItemsIn: aContainer
                    "Insert all of the directory
        items in of the current directory
25                   into aContainer."
            | items |
            items := OrderedCollection new.
            items add:
                    (TransIFile new
30                          name: 'InFile1';
                            ftype: 'I').
            items add:
                    (TransIFile new
                            name: 'InFile2';
35                          ftype: 'I').
            items add:
                    (TransIFile new
                            name: 'InFile3';
                            ftype: 'I').
40          items add:
                    (Transformer new
```

AT9-92-008

13

```
                            name: 'TransFile';
                    ftype: 'T').

aContainer contents: items.!

menu: aContainer
                "Add the view changing menu to
        the menu bar."
            aContainer setMenu: ( Menu new
                    appendSubMenu: ( Menu new
                            appendItem: 'Normal'
        selector: CvIcon ;
                            appendItem: 'Name'
        selector: CvName ;
                            appendItem: 'Name/Flow'
        selector: CvName | CvFlow ;
                            appendItem: 'Text'
        selector: CvText ;
                            appendItem: 'Text/Flow'
        selector: CvText | CvFlow ;
                            appendItem: 'Tree Icon'
        selector: CvTree | CvIcon ;
                            appendItem: 'Tree Name'
        selector: CvTree | CvName ;
                            appendItem: 'Tree Text'
        selector: CvTree | CvText ;
                            owner: container;
                            title: 'Icon';
                            yourself );
                    appendItem: 'Detail' selector:
        CvDetail | CaDetailsviewtitles;
                    owner: container;
                    title: '~View';
                    selector: #view:;
                    yourself )!

open
                "Open a TransExample on the
        directory named aPath

TransExample new open
```

AT9-92-008

14

```
        "
        | dragger cp |
        self label: 'TransExample'.
        self mainView style: ( self mainView
5     defaultFrameStyle | FcfShellposition ).
        self addSubpane: (cp := ContainerParent
      new).
        cp addSubpane: ((container := Container
      new)
10                owner:self;
                  title: 'Icon Transformation
      Example';
                  when: #getFields perform:
      #defineFieldsIn: ;
15                when: #getContents perform:
      #insertItemsIn: ;
                  when: #getMenu perform: #menu: ;
                  when: #startDrag perform:
      #startDrag: ;
20                when: #dropRequest perform:
      #droppingItems: ;
                  when: #dragComplete perform:
      #wasDragged: ;
                  when: #dropComplete perform:
25    #wasDropped: ;
                  when: #delete perform: #delete: ;
                  when: #select perform: #selected:
      ).

30        container setAttributes:
      CaMixedtargetemph.

dragger := DragDrop for: container.
          dragger
35                container: 'TransExample';
                  mechanisms: ( Array with:
      DragTest new ).
          container dragDrop: dragger.
          self openWindow!
40
      selected: aContainer
```

AT9-92-008

15

```
                    "The user has selected an item in
        aContainer.  If a
                    tree view is displayed, insert
        the children of the selected
 5                  item into the container."
            | item cnrInfo |
            cnrInfo := container queryCnrInfo.
            ( cnrInfo flWindowAttr bitAnd: CvTree ) =
        0
10                  ifFalse: [item := aContainer
        selection.
                            ( aContainer isSelected:
        item )
                    ifTrue: [ item
15      insertChildrenInto: aContainer ]]!

startDrag: aContainer
                    "Start a drag and drop session."
            | dragItems |
20                  ( dragItems := aContainer
        dragList ) isEmpty
                            ifFalse: [ aContainer
        dragDrop drag: dragItems ]!

25      textContents: aPane
                aPane contents: 'this is some text'!

view: aCvConstant
                container view: aCvConstant!
30
        wasDragged: aContainer
                    "An item was dragged inside
        aContainer."
                ^nil!
35
        wasDropped: aContainer
                    "An item was dropped inside
        aContainer."
            | item offset |
40          offset := 0@0.
```

AT9-92-008

16

```
        aContainer dragDrop items do: [ :dragItem
    |
                item := TransItem className:
    dragItem name ftype: (dragItem userInfo) ftype.
5               item notNil ifTrue: [
                            self drop: item
    into: aContainer at: offset.
                                    offset :=
    offset + 12 ].
10          ]! !

DRAG TEST CLASS SOURCE CODE

15
    DragTransfer subclass: #DragTest
        instanceVariableNames: ''
        classVariableNames: ''
        poolDictionaries:
20          'PMDragConstants PMConstants ' !

!DragTest class methods ! !

25
    !DragTest methods !
    renderingMechanism
                "Answer a string which describes
    the rendering
30              mechanism implemented."
            ^'DRM_OS2FILE'!

sourceTransfer: item
                "Private - The source will render
35  the item."
            | dragTransfer |
            dragTransfer := PMDragTransfer size: 1.
            dragTransfer
                cb: PMDragTransfer sizeInBytes;
40              hwndClient: owner owner handle;
```

AT9-92-008

17

```
                    pditem: item pmItem contents
        contents;
                    selectedRMF: ( '<', self
        renderingMechanism, ',', item format first, '>'
  5     );
                    renderToName: ( owner target,
        item pmItem targetName );
                    ulTargetInfo: 0;
                    usOperation: owner operation;
 10                 fsReply: 0.

( dragTransfer sendMsg: DmRender to: item
        pmItem hwndItem with: 0 )
                    ifTrue: [ ^nil ]
 15                 ifFalse: [item pmItem
                            sendTransferMsg:
        DmEndconversation
                            response: DmflTargetfail.
                        owner freeTransferItem:
 20     item
                    ]!

targetTransfer: item
                    "Private - The target will
 25     perform the rendering
                    operation without the direct
        involvement of the source."
            ( self transfer: item to: ( owner target,
        item name ) )
 30                 ifTrue: [item pmItem
                            sendTransferMsg:
        DmEndconversation
                            response:
        DmflTargetsuccessful.
 35                 ]
                    ifFalse: [item pmItem
                            sendTransferMsg:
        DmEndconversation
                            response:
 40     DmflTargetfail.
                    ].
```

AT9-92-008

18

```
        owner freeTransferItem: item!

transfer: item
                "Private - Begin the direct
5   manipulation operation."
        | hstrSrc tmpDir |
        owner target: owner target.
        hstrSrc := PMHandle fromBytes: item
    pmItem hstrSourceName.
10          ( hstrSrc = NullHandle or: [ ( owner
    isNativeFormat: item ) not ] )
                ifTrue: [ self sourceTransfer:
    item ]
                ifFalse: [ self targetTransfer:
15  item ]!

transfer: item to: dest
                "Private - Perform the actual
    operation and return true if successful."
20      | src operation |
        operation := owner operation.
        src := item pmItem containerName, item
    pmItem sourceName.
        ( src asUpperCase = dest asUpperCase )
25      ifTrue: [ ^true ].
       ^true! !
```

TRANSFORMATION ITEM SUBCLASS
SOURCE CODE

```
    ContainerItem subclass: #TransItem
35      instanceVariableNames:
            'ftype name '
        classVariableNames: ''
        poolDictionaries:
            'PMConstants PMContainerConstants ' !
40
```

AT9-92-008

19

```
    !TransItem class methods !

className: aName ftype: aType
                    "Answer a TransIFile, TransOFile
5   or Transformer
                    which corresponds to the ftype
    aType."
            (aType = 'O')
                    ifTrue: [
10                          ^TransOFile new
                                    name: aName;
                                    ftype: 'O';
    "Output/Transformed File"
                                    yourself ].
15
            (aType = 'T')
                    ifTrue: [
                            ^Transformer new
                            name: aName;
20                          ftype: 'T';
    "Transformation Icon"
                            yourself ]
                    ifFalse: [
                            ^TransIFile new
25                          name: aName;
                            ftype: 'I';  "Input file"
                            yourself ].!

className: aName transformedName: aTName
30              "Answer a TransOFile which
    corresponds to the
                    path aString."
            (aName = 'OutFile')
                    ifTrue: [
35                          ^TransOFile new
                            name: aTName;
                            ftype: 'O';
    "Output/Transformed File"
                            yourself ].! !
40
```

AT9-92-008

20

```
        !TransItem methods !

containerName
 5                      "Answer the name of the container
        this item is contained in.  The name is the
                        name used by the drag and drop
        protocols."
                ^'TransExample'!
10
        deleteChildTreesIn: aContainer
                        "Private - Delete all subtrees
        rooted by the receiver in
                        aContainer."
15              ^nil!

ftype
                        "Answer the ftype item of the
        receiver item."
20              ^ftype!

ftype: aTransItem
                        "Set the ftype of the receiver to
        aTransItem."
25              ftype := aTransItem!

insertChildrenInto: aContainer
                        "Private - insert all of the
        immediate children of the receiver
30                      into aContainer."
                ^nil!

name
                        "Answer the name string of the
35      receiver."
                ^name!

name: aString
                        "Set the name string of the
40      receiver."
                name := aString.
```

AT9-92-008

21 super name: aString! !

TRANSFORMATION INPUT FILE ITEM
SUBCLASS SOURCE CODE

```
TransItem subclass: #TransIFile
  instanceVariableNames: ''
  classVariableNames:
    'Icon '
  poolDictionaries: '' !

!TransIFile class methods !

aboutToSaveImage
        Icon := nil! !

!TransIFile methods !

icon
            "Return icon to be transformed"
        Icon := CursorManager pointerFromModule:
'dricon' id: 2.
        ^Icon! !
```

TRANSFORMATION TRANSFORMER SUBCLASS
SOURCE CODE

```
TransItem subclass: #Transformer
  instanceVariableNames: ''
  classVariableNames:
    'Icon '
  poolDictionaries:
    'PMContainerConstants ' !
```

AT9-92-008

22

```
        !Transformer class methods !

aboutToSaveImage
5               Icon := nil! !

!Transformer methods !
10
        attributes
                        "Answer the item attributes.  In
        this case allow dropping onto
                        the receiver."
15              ^CraDroponable!

icon
                        "Return icon of the icon
        transformer."
20              Icon := CursorManager pointerFromModule:
        'dricon' id: 3.
                ^Icon!

insertChildrenInto: aContainer
25                      "Private - insert all of the
        immediate children of the receiver
                        into aContainer."
                ^nil!

30      isChildrenCurrent
                        "Private - Answer true if the
        children of the receiver matches the current
                        folder contents in the receiver,
        otherwise false."
35              ^nil!

isDroponable
                        "Answer true if the receiver can
        have items dropped on it, otherwise false."
40              ^true! !
```

AT9-92-008

23

TRANSFORMATION OUTPUT FILE SUBCLASS SOURCE CODE

```
5       TransItem subclass: #TransOFile
           instanceVariableNames: ''
           classVariableNames:
             'Icon '
           poolDictionaries: '' !
10

!TransOFile class methods !

aboutToSaveImage
15              Icon := nil! !

!TransOFile methods !
20
        icon
                        "Return transformed icon"
                Icon := CursorManager pointerFromModule:
        'dricon' id: 60.
25              ^Icon! !
``` output object. It also contains the rules to change the contents of dropped objects.

The drag objects were created to represent the input file object (the one to be transformed), the transformer object (the one that performs an action on the contents of the dropped object), and the output file object (the object after it has been transformed). Note that the output file object retains many of the attributes of the input file object, except most notably, the contents of the object changes as well as the shape, size, and or hues of the icon. This visually signifies that the object underwent a transformation. Note that transformations need not take place only on document or text objects. They can also occur on other objects as well, so long as there is a defined process of transformation from the input to the output object.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for converting a data object from a first form to a second form, said apparatus comprising:
   (a) cursor selection means for selecting a first icon associated with said data object in said first form;
   (b) means for positioning the first icon over a transformation icon, wherein said transformation icon is associated with conversion code operable to convert said data object in said first form to said second form;
   (c) means for retrieving attributes of said data object in said first form associated with said first icon;
   (d) means for determining if said attributes of said data object in said first form associated with said first icon match expected attributes associated with said conversion code operable to convert said data object in said first form to said second form;
   (e) means, operable when said attributes of said data object in said first form associated with said first icon match expected attributes associated with said conversion code, for removing said first icon associated with said data object in said first form;
   (f) means, operable when said attributes of said data object in said first form associated with said first icon match expected attributes associated with said conversion code, for executing said conversion code to convert said data object in said first form to said second form; and
   (g) means, operable when said attributes of said data object in said first form associated with said first icon match expected attributes associated with said conversion code, for creating a second icon associated with said data object converted from said first form to said second form by said conversion code.

2. An apparatus as recited in claim 1, including means for transforming more than one icon at a time.

3. An apparatus as recited in claim 1, including data structure means, associated with the transformation icon, for storing rules defining the characteristics of the transformation operation.

4. An apparatus as recited in claim 1, including means, operable when said attributes of said data object in said first form associated with said first icon do not match expected attributes associated with said conversion code, for creating a third icon indicating that said first data object associated with said first icon cannot be converted from said first form to said second form by said conversion code associated with said transformation icon.

5. An apparatus as recited in claim 1, including means for transforming the first icon into one or more of the second icon.

6. An apparatus as recited in claim 1, including means for transforming one or more of the first icon into the second icon.

7. An apparatus as recited in claim 1, including means for transforming one or more of the first icon into one or more of the second icon.

8. A method for converting a data object from a first form to a second form, comprising the steps of:
   (a) selecting a first icon associated with said data object in said first form;
   (b) positioning the first icon over a transformation icon, wherein said transformation icon is associated with conversion code operable to convert said data object in said first form to said second form;
   (c) retrieving attributes of said data object in said first form associated with said first icon;
   (d) determining if said attributes of said data object in said first form associated with said first icon match expected attributes associated with said conversion code operable to convert said data object in said first form to said second form;
   (e) removing said first icon associated with said data object in said first form;
   (f) executing said conversion code to convert said data object in said first form to said second form; and
   (g) creating a second icon associated with said data object converted from said first form to said second form by said conversion code.

9. A method as recited in claim 8, including the step of transforming more than one icon at a time.

10. A method as recited in claim 8, including the step of associating a data structure with the transformation icon to store rules defining the characteristics of the transformation operation.

11. A method as recited in claim 8, including the step of creating a third icon indicating that said first data object associated with said first icon cannot be converted from said first form to said second form by said conversion code associated with said transformation icon.

12. A method as recited in claim 8, including the step of transforming the first icon into one or more of the second icon.

13. A method as recited in claim 8, including the step of transforming one or more of the first icon into the second icon.

14. A method as recited in claim 8, including the step of transforming one or more of the first icon into of the second icon.

15. A computer program product for converting a data object from a first form to a second form for execution with a computer system having a central processing unit and display adapter for displaying information including a plurality of icons with at least one transformation icon, said computer program stored on a computer readable medium in a binary digital format directly executable by a processor in a computer system device, comprising:
   (a) cursor selection means for selecting a first icon associated with said data object in said first form;
   (b) means for positioning the first icon over a transformation icon, wherein said transformation icon is associated with conversion code operable to convert said data object in said first form to said second form;

(c) means for retrieving attributes of said data object in said first form associated with said first icon;

(d) means for determining if said attributes of said data object in said first form associated with said first icon match expected attributes associated with said conversion code operable to convert said data object in said first form to said second form;

(e) means, operable when said attributes of said data object in said first form associated with said first icon match expected attributes associated with said conversion code, for removing said first icon associated with said data object in said first form;

(f) means, operable when said attributes of said data object in said first form associated with said first icon match expected attributes associated with said conversion code, for executing said conversion code to convert said data object in said first form to said second form; and (g) means for creating a second icon associated with said data object converted from said first form to said second form by said conversion code.

16. A computer program as recited in claim 15, including means for transforming more than one icon at a time.

17. A computer program as recited in claim 15, including data structure means, associated with the transformation icon, for storing rules defining the characteristics of the transformation operation.

18. A computer program product as recited in claim 15, including means for creating a third icon indicating that said first data object associated with said first icon cannot be converted from said first form to said second form by said conversion code associated with said transformation icon.

19. The apparatus as recited in claim 1, wherein said data object is a word processing document.

* * * * *